United States Patent
Gaydos et al.

[11] Patent Number: 6,074,783
[45] Date of Patent: Jun. 13, 2000

[54] HYDROGEN STORAGE ALLOYS FOR USE IN RECHARGEABLE ELECTROCHEMICAL CELLS, AND METHODS OF PRODUCING THEM

[75] Inventors: Mark Gaydos, Nashua, N.H.; Philip D. Trainer, Medway, Mass.

[73] Assignee: Duracell Inc., Bethel, Conn.

[21] Appl. No.: 08/978,699

[22] Filed: Dec. 4, 1997

Related U.S. Application Data

[60] Provisional application No. 60/033,616, Dec. 19, 1996.

[51] Int. Cl.[7] .................................................. H01M 10/34
[52] U.S. Cl. ........................................ 429/218.2; 429/223
[58] Field of Search .................................. 429/218.2, 223

[56] References Cited

U.S. PATENT DOCUMENTS

| | | |
|---|---|---|
| 4,605,603 | 8/1986 | Kanda et al. |
| 4,696,873 | 9/1987 | Yagasaki et al. |
| 4,898,794 | 2/1990 | Doi et al. |
| 4,935,318 | 6/1990 | Ikoma et al. |
| 5,244,758 | 9/1993 | Bronoel et al. |
| 5,354,576 | 10/1994 | Zhang et al. ........................ 429/218.2 |
| 5,405,719 | 4/1995 | Sonoda et al. |
| 5,654,115 | 8/1997 | Hasebe et al. ....................... 429/218.2 |

FOREIGN PATENT DOCUMENTS

H5-132322  4/1993  Japan.

*Primary Examiner*—Deborah Yee
*Attorney, Agent, or Firm*—Fish & Richardson P.C.

[57] ABSTRACT

An $AB_5$-type hydrogen absorbing alloy composition for use in an electrochemical cell includes between about 0.001 and 0.01 mole percent of zirconium and/or titanium dispersed throughout the alloy. Methods of producing the alloy are also disclosed. The levels of these elements have been selected to maintain low hydrogen equilibrium pressure, high capacity, and acceptable activation characteristics, along with improved storage characteristics and improved cycle life from reduced corrosion.

16 Claims, 7 Drawing Sheets

3.0 Ahr 4/3A 45°C Cycle life
Charge C Rate, -dV, Discharge 5A, 1.0v cut-off

Rt Cyle Life, 4/3A, 3100, C Rate, -dV Charge

HYDROGEN STORAGE ALLOYS FOR USE IN RECHARGEABLE ELECTROCHEMICAL CELLS, AND METHODS OF PRODUCING THEM

CROSS REFERENCE TO RELATED APPLICATIONS

This application claims an invention disclosed in U.S. provisional application Ser. No. 60/033,616, filed Dec. 19, 1996.

BACKGROUND OF THE INVENTION

The present invention relates to hydrogen storage alloys for use in rechargeable electrochemical cells. Hydrogen storage alloys provide improved performance characteristics such as high energy density, longer charge retention, longer cycle life and low temperature operation, when used in rechargeable electrochemical systems.

The use of AB5 type alloys for hydrogen storage electrodes is well known. Rechargeable batteries utilizing AB5 type negative electrodes are described for example in U.S. Pat. Nos. 3,874,928, 4,214,043, 4,107,405, 4,112,199, 4,125,688, 4,214,043, 4,216,274, 4,487,817, 4,605,603, 4,696,873 and 4,699,856.

The use of $LaNi_5$ alloys, which have a high hydrogen content and high hydrogen storing capacity has been widely reported. However, lanthanum is an expensive element, and commercial, large-scale utilization of such an alloy is not practical.

Efforts have been made to keep the excellent hydrogen storage capacity of the $LaNi_5$ type alloy yet improve the cost and commercial use of such alloys by substitution of various metals into the alloy. The selection and role of modifiers or substitute metals in the LaNi, type alloys depends on the desired properties for the final cell. For electrochemical applications, all performance attributes such as cycle life, rate of discharge, discharge voltage, polarization, self discharge, low temperature capacity and low temperature voltage must be considered when choosing a substitute metal. The effect of such substitutes on cell pressure must be considered since excessive hydrogen pressure can result in loss of aqueous-based electrolyte material, thereby limiting cell life; or otherwise destroying the cell.

While prior art hydrogen storage alloys frequently incorporate various individual modifiers and combinations of modifiers to enhance their performance characteristics, there is no clear teaching of the role of any individual modifier, the interaction of any modifier with other components of the alloy, or the effects of any modifier on specific operational parameters.

U.S. Pat. No. 4,107,405 describes electrode materials based on lanthanum and nickel having a formula close to $LaNi_5$ in which one of the components is partially substituted by a metal selected from those in groups Ia, II, III, IV and Va of the periodic table of elements, and other than lanthanides, in an atomic proportion which is not zero, being higher than 0.1 percent and lower than 25 percent with respect to the lanthanum.

U.S. Pat. No. 4,487,817 describes a negative electrode of electrochemically active material which consists of an intermetallic compound having the formula $AB_mC_n$, in which A consists of mischmetal or at least one element selected from Y, Ti, Hf, Zr, Ca, Th, La and the remaining rare earth metals, B consists of two or more elements selected from Ni, Co, Cu, Fe and Mn, and in which C consists of at least one element selected from Al, Cr and Si.

U.S. Pat. No. 4,925,748 describes a hydrogen absorbing alloy represented by the general formula $A_{1-x}B_xC_yD_z$, in which A is selected from the group consisting of La, mixtures of La and rare-earth elements, and mischmetal; B is selected from the group Ti, Zr, Ca, Y, Hf and mixtures thereof, C is selected from the group consisting of Ni, Co, Mn, Al, Fe, Cu, Cr and mixtures thereof and D is selected from the group consisting of V, In, Tl, Ga and mixtures thereof.

U.S. Pat. No. 4,983,474 describes a hydrogen absorbing Ni-based alloy comprising Ti, Zr, Mn, V, Fe, Al and Ni. The patent describes the role of each component in contributing to the properties of the electrochemical cell. The patent discusses the role of manganese in improving hydrogen absorption and corrosion resistance in the particular $AB_2$-type system disclosed, and further that the effects of manganese are not fully obtained when its content is below 4% by weight.

U.S. Pat. No. 5,032,475 describes a nickel metal hydride cell having a hydrogen absorbing alloy in the mixture for the negative electrode, represented by the general formula, $XY_{5-a}Z_a$; where X is a rare earth element, Y is Ni and Z is at least an element selected from Co, Mn, Ag, V, Cu and B; namely $LaNi_5$ (mischmetal) and the like in which Ni is partially replaced by Al, Mn, Fe, Co, Ti, Cu, Zn, Zr, Cr or B.

U.S. Pat. No. 5,034,289 describes the addition of a hydrophobic material to a standard hydrogen absorbing alloy such as $MnNi_{3.55}Co_{0.75}Mn_{0.4}Al_{10.3}$.

Although prior art alloys have yielded cells that exhibit a quantitative improvement in one or two performance characteristics at the expense of other performance characteristics, the trade-off results in a compromise in performance thus yielding cells with both good and bad characteristics.

High capacity nickel metal hydride rechargeable cell systems tend to build up heat more rapidly during cycling and dissipate heat more slowly depending on the size of the cells. In addition, certain sizes of these cells may fall to less than 80% of their rated capacity on repeated charge/discharge cycles when overcharged in excess of 15%, even at room temperature. The loss of capacity is believed to result from corrosion or degradation of the $AB_5$ hydrogen storage alloy comprising the active material in the negative electrode and the electrolyte. The corrosion rate is further accelerated by the high operating temperatures and by high temperatures resulting from repeated charge/discharge cycles. The pulverization of the active material in the negative electrode resulting from successive charging and discharging of the cell exposes fresh alloy surface to the electrolyte, further adding to the corrosion process.

SUMMARY OF THE INVENTION

The present invention provides hydrogen storage alloy electrodes characterized by using hydrogen storage alloys of a multi-component system containing small amounts of zirconium and/or titanium at levels much lower than those found in prior formulations. The levels of these elements have been selected to maintain low hydrogen equilibrium pressure, high capacity, and activation characteristics comparable to prior art hydrogen storage alloys; yet with improved storage characteristics and improved cycle life from reduced corrosion.

By alloys, we mean that the elements of the compound are each homogeneously dispersed throughout the metallic matrix.

By keeping the amount of zirconium or titanium in the alloy below 0.01 mole percent, the Zr or Ti remains dispersed in the matrix and the formation of $ZrNi_5$ and/or $TiNi_3$, phases which will not store hydrogen and can raise the operating pressure, is avoided.

The hydrogen absorbing alloy of the present invention may be represented by the following general formula:

$$LM_xNi_{A-(B+C+D)}Co_BAl_CMn_D$$

where L is mischmetal with La representing 45% to 70% and the balance being other Rare Earth metals; M is Ti or Zr; X is from 0.001 to 0.01; A is from 4.9 to 5.2 (preferably, 5.0 to 5.1); B is from 0.4 to 1.0; C is from 0.1 to 0.6; and D is from 0 to 0.45.

According to one aspect of the invention, an $AB_5$-type hydrogen absorbing alloy composition for use in an electrochemical cell is essentially according to the formulation $LM_XNi_{A-(B+C+D)}Co_BAl_CMn_D$, where L includes mischmetal including between about 45 and 70 percent lanthanum, M is an element selected from the group consisting of titanium and zirconium, X is between 0.001 and 0.01, B and C are each greater than zero, and A is about 5. Preferably, B is between about 0.4 and 1.0, C is between about 0.1 and 0.6, and D is less than about 0.45. X is preferably between about 0.002 and 0.006, more preferably about 0.0035.

According to another aspect of the invention, an $AB_5$-type hydrogen absorbing alloy composition for use in an electrochemical cell includes between about 0.001 and 0.01 mole percent of an alloying element dispersed throughout the alloy, with the alloying element selected from the group consisting of titanium, zirconium, and combinations thereof.

In some embodiments, the alloy is essentially according to the formulation $LM_XQ_5$, where L represents mischmetal including between about 45 and 70 percent lanthanum, M represents the alloying element, X is between 0.001 and 0.01, and Q includes nickel. In some cases, Q also includes cobalt and aluminum. Manganese is also included in some formulations.

One preferred formulation is $La_{0.63}Ce_{0.26}Nd_{0.08}Pr_{0.03}M_XNi_{3.7}Co_{0.78}Al_{0.28}Mn_{0.36}$, where M represent an alloying element selected from the group consisting of titanium and zirconium and combinations thereof, and X is between 0.001 and 0.01.

According to yet another aspect of the invention, a method is provided for producing an $AB_5$ hydrogen storage alloy for use in an electrochemical cell. The method includes melting a melt charge in an inert environment under superatmospheric pressure (the melt charge comprising mischmetal, nickel, cobalt and aluminum), adding an alloying element to the molten melt charge (the alloying element selected from the group consisting of zirconium, titanium, and mixtures thereof, the amount of added alloying element selected to produce an alloy having between 0.01 and 0.001 mole percent of the alloying element), and allowing the melt charge to cool to room temperature.

According to another aspect, the method of the invention includes providing a melt charge comprising mischmetal, nickel, cobalt and aluminum; placing the melt charge in a furnace; establishing a pressurized furnace environment substantially of argon gas; melting the melt charge while maintaining the furnace environment pressure; adding an alloying element to the molten melt charge, the alloying element selected from the group consisting of zirconium, titanium, and mixtures thereof, the amount of added alloying element selected to produce an alloy with between 0.01 and 0.001 mole percent of said alloying element; and allowing the alloy to cool to less than 50 degrees Celsius.

Preferably, the cooled alloy is heat treated for at least about 8 hours at about 1050 degrees Celsius.

The cooled alloy may be pulverized to produce an alloy powder, which may be sieved to remove particles greater than about 75 microns in size.

According to yet another aspect, the invention features an electrochemical cell. The cell includes a positive electrode containing nickel hydroxide, and a negative electrode containing an $AB_5$-type hydrogen absorbing alloy. The alloy has between about 0.001 and 0.01 mole percent of an alloying element dispersed throughout the alloy, where the alloying element is selected from the group consisting of titanium, zirconium, and combinations thereof.

The invention also features, in another aspect, a metallic particle for use in an electrode of an electrochemical cell. The particle consists essentially of an $AB_5$-type hydrogen absorbing alloy comprising $LM_XNi_{A-(B+C+D)}Co_BAl_CMn_D$, where L represents mischmetal including between about 45 and 70 percent lanthanum, M represents an alloying element selected from the group consisting of titanium and zirconium and combinations thereof, X is between 0.001 and 0.01, B and C are each greater than zero, and A is about 5. The particle will, during use, develop oxides at its surface.

In general, the mole percentage of the lanthanum should be between about 0.6 and 0.8, and the mole percentage of Ce is preferred to be between about 0.1 and 0.3. The remainder of the 1.0 mole percent mischmetal includes Nd and Pr.

The present invention provides hydrogen storage alloys of the AB5 type which contain low levels of zirconium and/or titanium additives, meaning they contain levels of less than 0.01 mole percent zirconium and/or titanium. Conventional AB5 type hydrogen storage alloys typically contain levels of 0.01 mole percent or higher. The hydrogen storage alloys of the present invention, when used in nickel-metal hydride rechargeable batteries, have extended cycle life and high temperature storage time without compromising the alloy's capacity or hydrogen equilibrium pressure.

Other advantages and features will be evident from the following description, drawings and claims.

DESCRIPTION OF EMBODIMENTS

Figure 1:
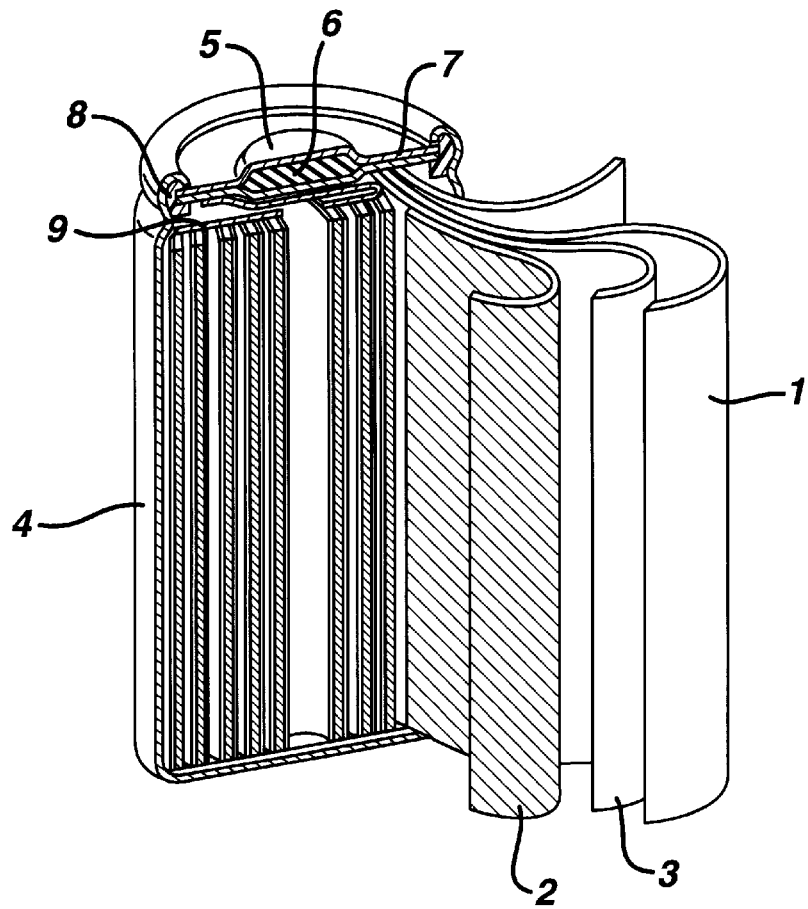
FIG. 1 illustrates a wound electrochemical cell.

FIG. 1 shows a typical rechargeable cell which consists of a Ni-plated steel can 4, a safety vent 6, a sealing plate 7, a metal hydride negative electrode 1, a nickel positive electrode 2, a positive electrode cap 5, a separator 3, an insulating gasket 8, and a positive electrode collector 9.

The positive electrode is made by mixing spherical nickel hydroxide and cobalt monoxide powders, at a weight ratio of 92.6:7.4, with a binding medium in the presence of water to produce a paste, which may be applied to a highly porous felt or foam substrate.

The hydrogen absorbing alloy negative electrode is made by forming a layer of a mixture of hydrogen absorbing powder and carbon at a weight ratio of 1000:7 with a binding medium and water to produce a paste, which may be applied to a conductive core substrate, typically nickel foil. Paste formulations are described in more detail in pending U.S. patent application Ser. No. 08/884,592, the contents of which are hereby incorporated by reference.

Preparation of the Alloys

In the examples that follow, the hydrogen absorbing alloy is prepared using the following general procedure. The Ce-mischmetal (approximate composition La: 25%, Nd: 175%, Pr: 6%, Ce: balance), La-mischmetal (approximate composition Nd: 10%, Pr: 2.5%, Ce: 1%, La: balance), nickel, cobalt, aluminum, lanthanum, neodymium, and praseodymium are melted together in the required quantities to achieve the desired compositions. The melt charge is loaded into a magnesia crucible installed in an induction furnace. The atmosphere inside the furnace is evacuated to obtain a vacuum state of 0.02 torr. Immediately before melting, the furnace is filled with argon to a pressure of 780 to 790 torr which is maintained during the melting operation. Zirconium and/or titanium are added to the molten charge several minutes before it is poured on to a copper block and allowed to cool to ambient temperature (less than 50 degrees C.). By adding the Zr or Ti to the mixture while molten, the Zr/Ti is dispersed throughout the matrix of the alloy. Titanium is a bit harder to dissolve than zirconium, and tends to come out in an undesirable secondary phase with nickel ($TiNi_3$).

The resulting alloy is heat treated for 6 to 12 hours (preferably about 8 hours or more) at 950 to 1150 C. (preferably about 1050 C.) in argon to homogenize the casting and to give the pressure plateau of the alloy more definition. The heat treated alloy is then pulverized by repeated hydrogen absorption and desorption. Other pulverization means, such as mechanical milling or jet milling, can also be used. The resulting powder is sieved to remove particles greater than 75 microns.

Using the above described procedure, the following alloys were prepared and tested:

Alloys tested:

A: $La_{0.3}Ce_{0.5}Nd_{0.15}Pr_{0.05}Ni_{3.5}Co_{0.75}Mn_{0.43}Al_{0.32}$

B: $La_{0.3}Ce_{0.5}Nd_{0.15}Pr_{0.05}Ti_{0.013}Ni_{3.5}Co_{0.75}Al_{0.33}Mn_{0.42}$

C: $La_{0.45}Ce_{0.35}Nd_{0.15}Pr_{0.05}Ti_{0.013}Ni_{3.7}Co_{0.7}Al_{0.6}$

D: $La_{0.45}Ce_{0.35}Nd_{0.15}Pr_{0.05}Zr_{0.007}Ni_{3.7}Co_{0.7}Al_{0.6}$

E: $La_{0.45}Ce_{0.35}Nd_{0.15}Pr_{0.05}Zr_{0.0034}Ni_{3.7}Co_{0.7}Al_{0.6}$

F: $La_{0.45}Ce_{0.35}Nd_{0.15}Pr_{0.05}Ni_{3.7}Co_{0.7}Al_{0.6}$

G: $La_{0.65}Ce_{0.2}Nd_{0.1}Pr_{0.05}Ti_{0.013}Zr_{0.0034}Ni_{3.65}Co_{0.85}Al_{0.5}$

H: $La_{0.65}Ce_{0.2}Nd_{0.1}Pr_{0.05}Ti_{0.013}Ni_{3.65}Co_{0.85}Al_{0.5}$

J: $La_{0.65}Ce_{0.2}Nd_{0.1}Pr_{0.05}Zr_{0.0034}Ni_{3.65}Co_{0.85}Al_{0.5}$

K: $La_{0.45}Ce_{0.35}Nd_{0.15}Pr_{0.05}Zr_{0.0034}Ni_{3.65}Co_{0.75}Al_{0.55}Mn_{0.05}$

L: $La_{0.53}Ce_{0.03}Nd_{0.34}Pr_{0.1}Ni_{4.08}Co_{0.4}Al_{0.34}Mn_{0.44}$

M: $La_{0.53}Ce_{0.03}Nd_{0.34}Pr_{0.1}Zr_{0.0034}Ni_{4.08}Co_{0.4}Al_{0.34}Mn_{0.44}$

N: $La_{0.3}Ce_{0.5}Nd_{0.15}Pr_{0.05}Zr_{0.0035}Ni_{3.55}Co_{0.75}Mn_{0.4}Al_{0.3}$

P: $La_{0.63}Ce_{0.26}Nd_{0.08}Pr_{0.03}Ni_{3.68}Co_{0.78}Mn_{0.36}Al_{0.28}$

Q: $La_{0.63}Ce_{0.26}Nd_{0.08}Pr_{0.03}Zr_{0.0035}Ni_{3.68}Co_{0.78}Mn_{0.36}Al_{0.28}$

R: $La_{0.7}Ce_{0.15}Nd_{0.1}Pr_{0.05}Ni_{3.7}Co_{0.85}Al_{0.45}$

S: $La_{0.7}Ce_{0.15}Nd_{0.1}Pr_{0.05}Zr_{0.005}Ni_{3.7}CO_{0.85}Al_{0.45}$

T: $La_{0.405}Ce_{0.15}Nd_{0.135}Pr_{0.045}Zr_{0.1}Ni_{3.7}Co_{0.85}Al_{0.45}$

Figure 2:
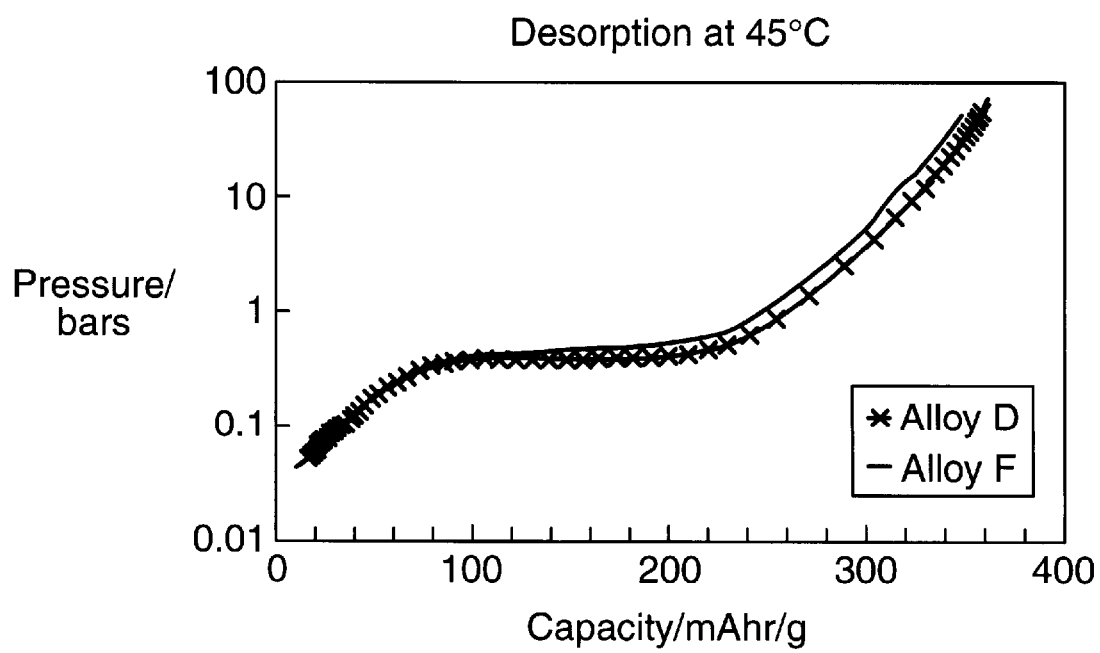
FIGS. 2–5 show hydrogen desorption characteristics of alloys with and without Zr and Ti.
Figure 3:
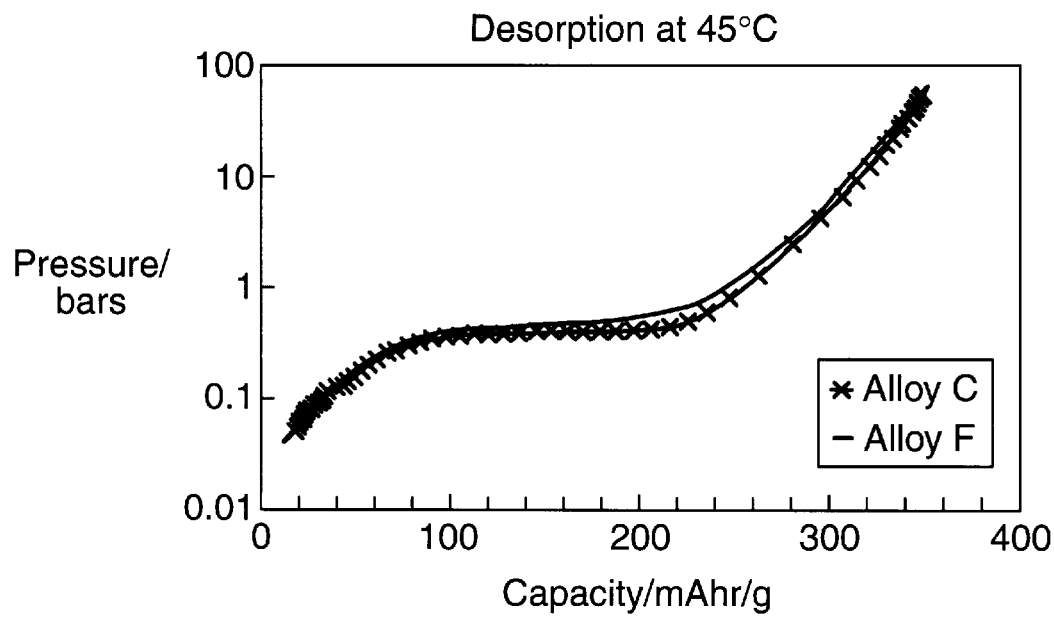

FIGS. 2 and 3 show the addition of 0.15% by weight of Zr ($Zr_{0.007}$) or Ti ($Ti_{0.013}$) to an alloy of $La_{0.45}Ce_{0.35}Nd_{0.15}Pr_{0.05}Ni_{3.7}Co_{0.7}Al_{0.6}$ has no detrimental effects on its desorption pressure or capacity. To be useful in rechargeable batteries, metal hydride alloys are desired to have hydrogen equilibrium plateau pressures at 45° from 0.2 to 2 bars and capacity of at least 260 mAhr/g in the region between 0.05 and 2 bars. With a plateau pressure of less than about 0.2 bar, the alloy has less of a tendency to give up charge, while alloys with plateau pressures of greater than about 2 bars may lead to excessive internal cell pressure. The salient points of the comparison of the two alloys are that the mid-point of the plateau and the capacity for the Zr-added alloy is comparable to that of the alloy without Zr. The addition of appreciable amounts of Zr, such as would be needed to result in a secondary phase of $ZrNi_5$, should be expected to lower the gravimetric capacity since $ZrNi_5$ will not store hydrogen.

Figure 4:
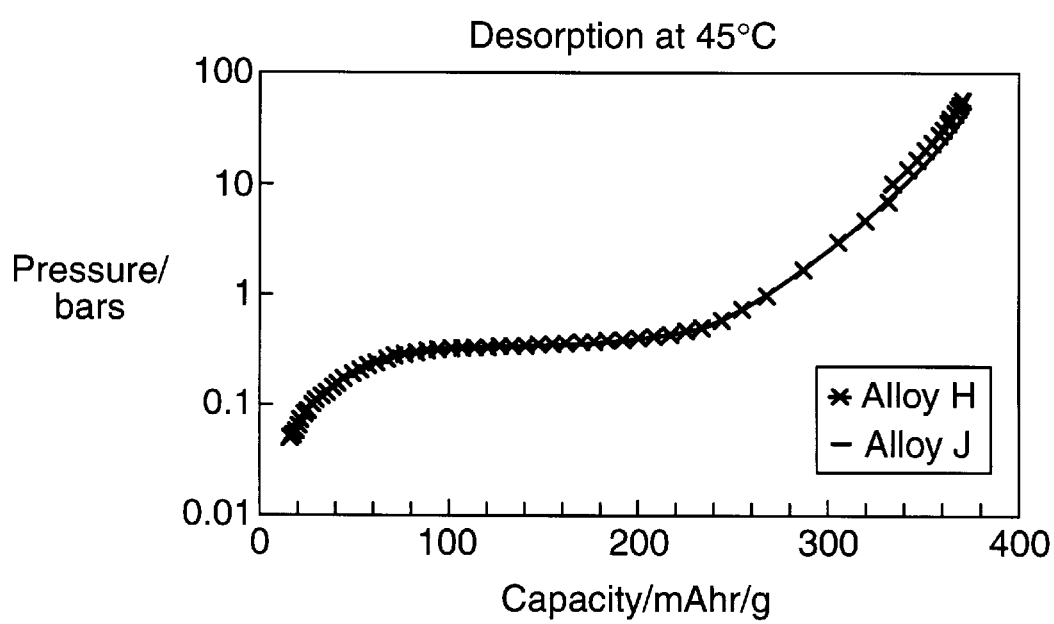
Figure 5:
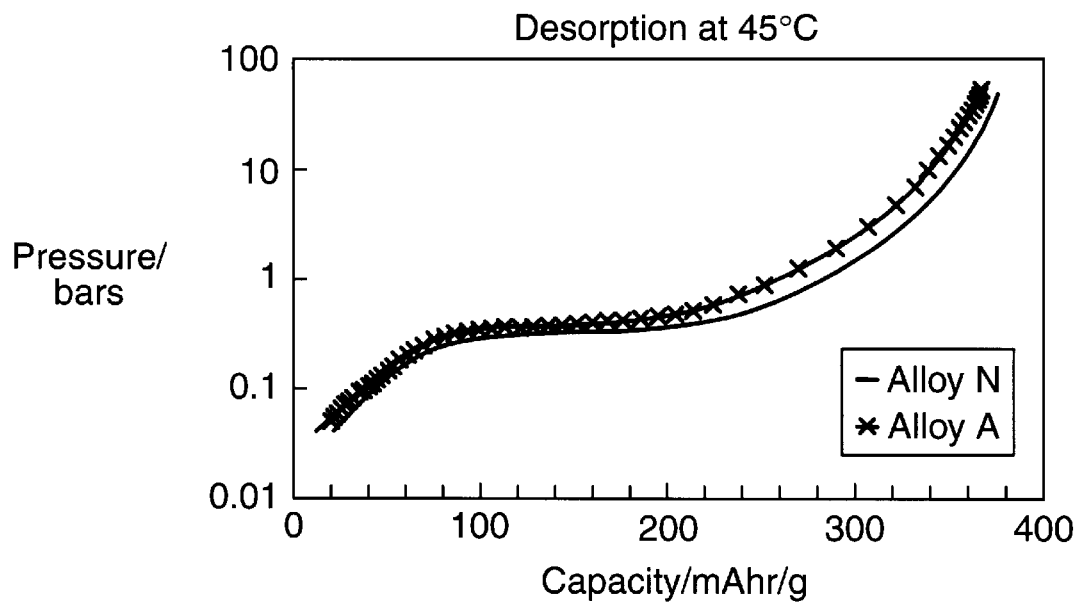
Figure 6:
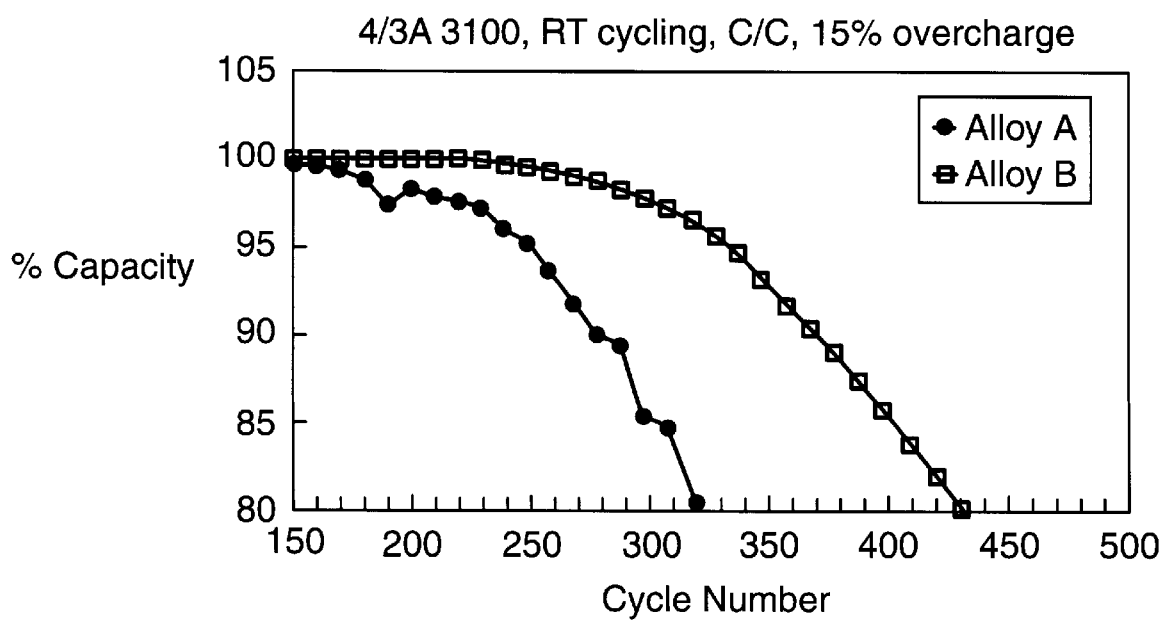
FIGS. 6–11 show cycle life at room and elevated temperatures for alloys with various amounts of Zr and Ti.
Figure 7:
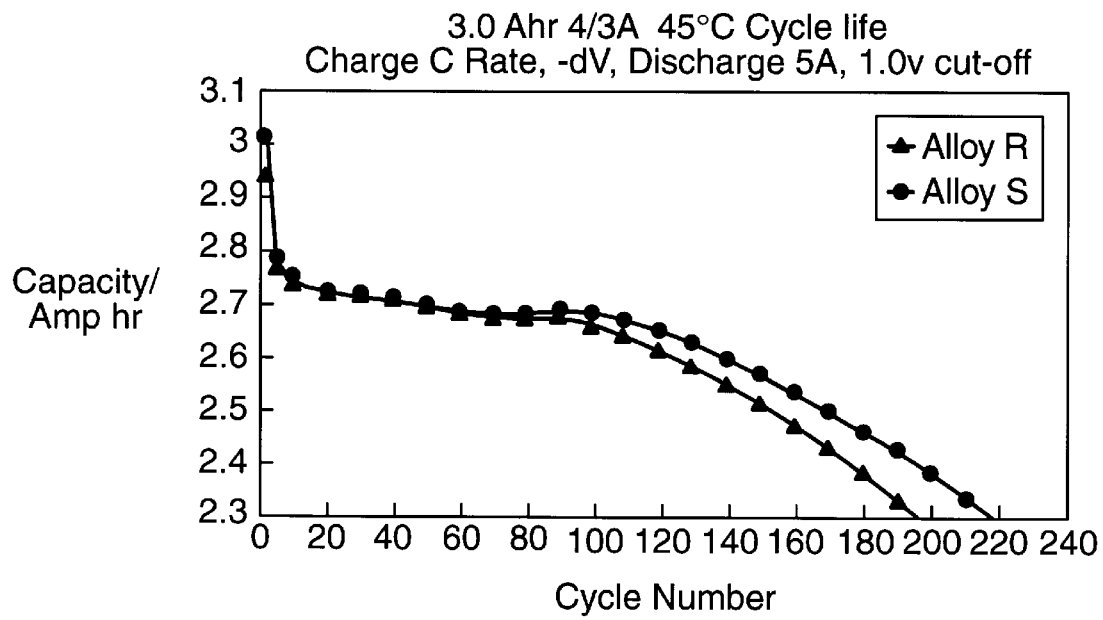
Figure 8:
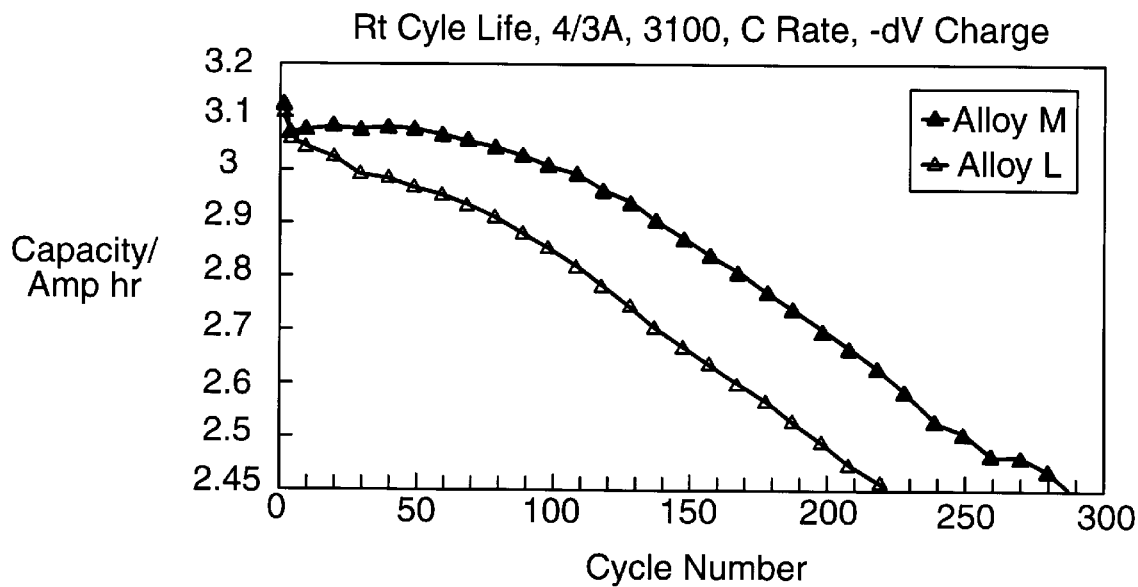
Figure 9:
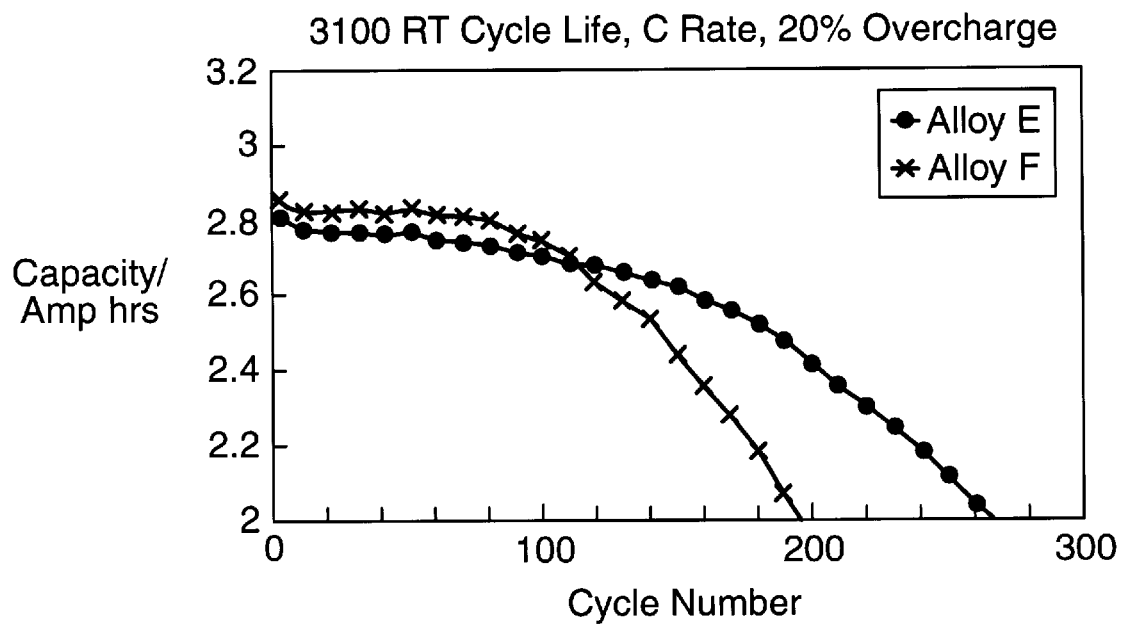
Figure 10:
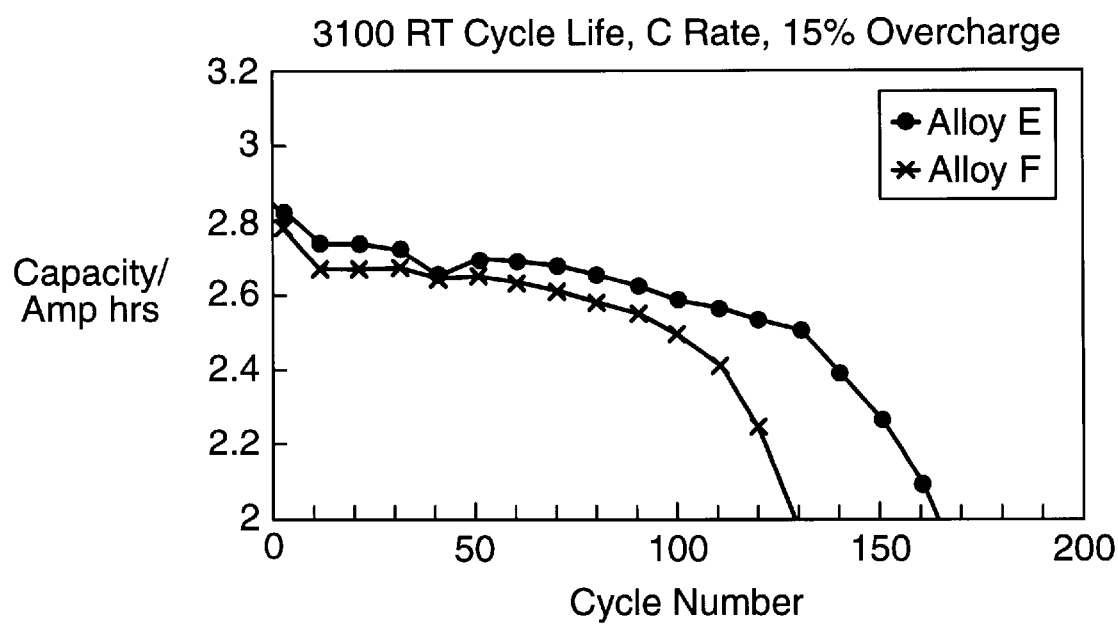
Figure 11:
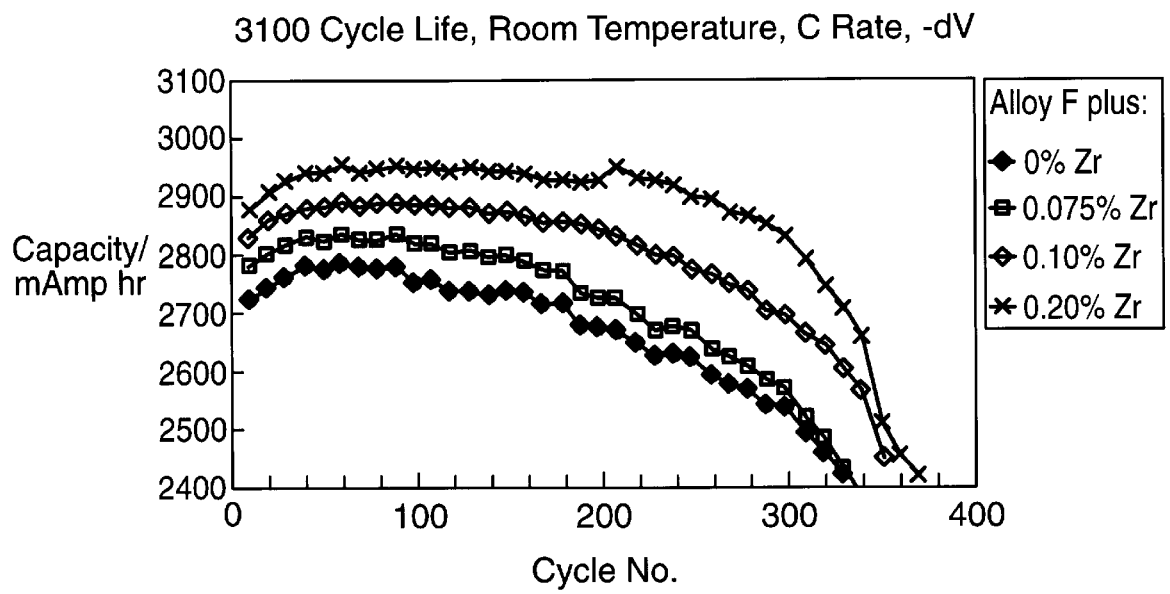

These same comparisons can be made in FIGS. 4 and 5. FIG. 4 shows the addition of 0.13% Zr by weight ($Zr_{0.006}$) to an alloy of $La_{0.65}Ce_{0.2}Nd_{0.1}Pr_{0.05}Ni_{3.65}Co_{0.85}Al_{0.5}$ has no significant effect on its desorption pressure or capacity. FIG. 5 shows the addition of 0.15% Zr by weight ($Zr_{0.007}$) to an alloy of $La_{0.3}Ce_{0.5}Nd_{0.15}Pr_{0.05}Ni_{3.5}Co_{0.75}Mn_{0.43}Al_{0.32}$ results in a slight increase in its desorption pressure and a slight decrease in its desorption capacity.

FIGS. 6 through 11 show the improvement in various charge-discharge (cycling) conditions for several alloy formulations with and without Zr or Ti additions. Each figure shows an increase in the number of cycles to the 80% cut-off as a result of the addition of Ti or Zr.

Figure 12:
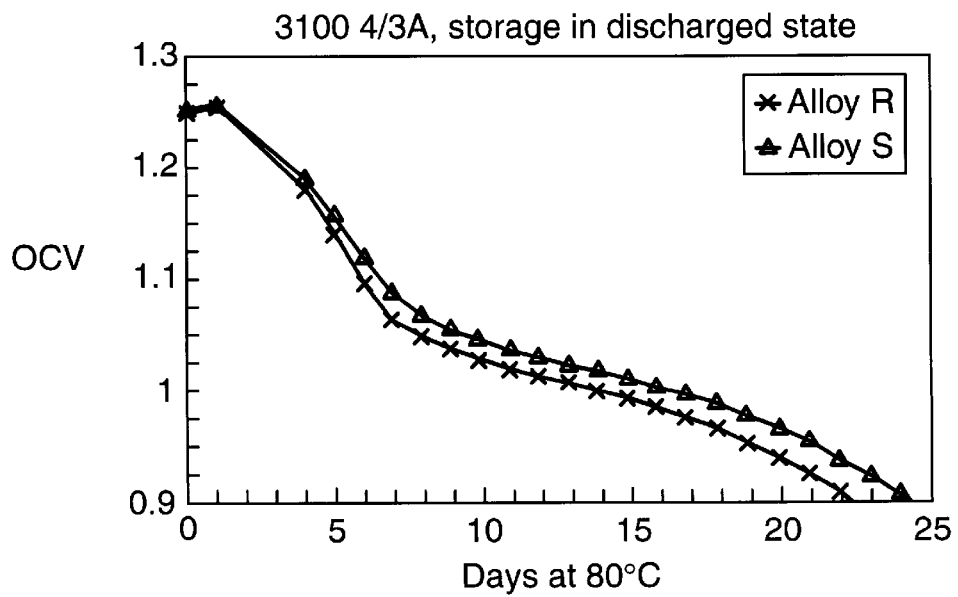
FIGS. 12 and 13 show the increase in the storage life of a cell resulting from the addition of $Zr_{0.00}$ to two alloys.
Figure 13:
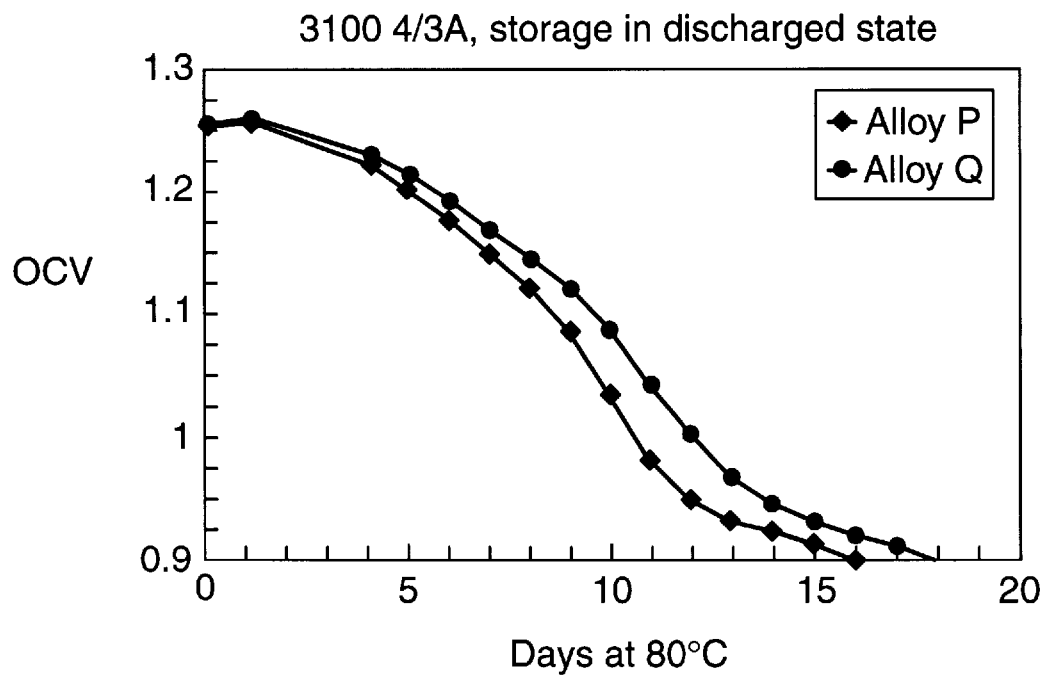

FIGS. 12 and 13 show the increase in the time for a discharged cell at 80° C. to fall to an open circuit voltage of 1.0 volt resulting from the addition of $Zr_{0.005}$ to an alloy of $La_{0.7}Ce_{0.15}Nd_{0.1}Pr_{0.05}Ni_{3.7}Co_{0.85}Al_{0.45}$ and to an alloy of $La_{0.63}Ce_{0.26}Nd_{0.08}Pr_{0.03}Ni_{3.68}Co_{0.78}Mn_{0.36}Al_{0.28}$. The time needed for the cell voltage to drop to 1.0 volt indicates the useful storage life of the cell.

Figure 14:
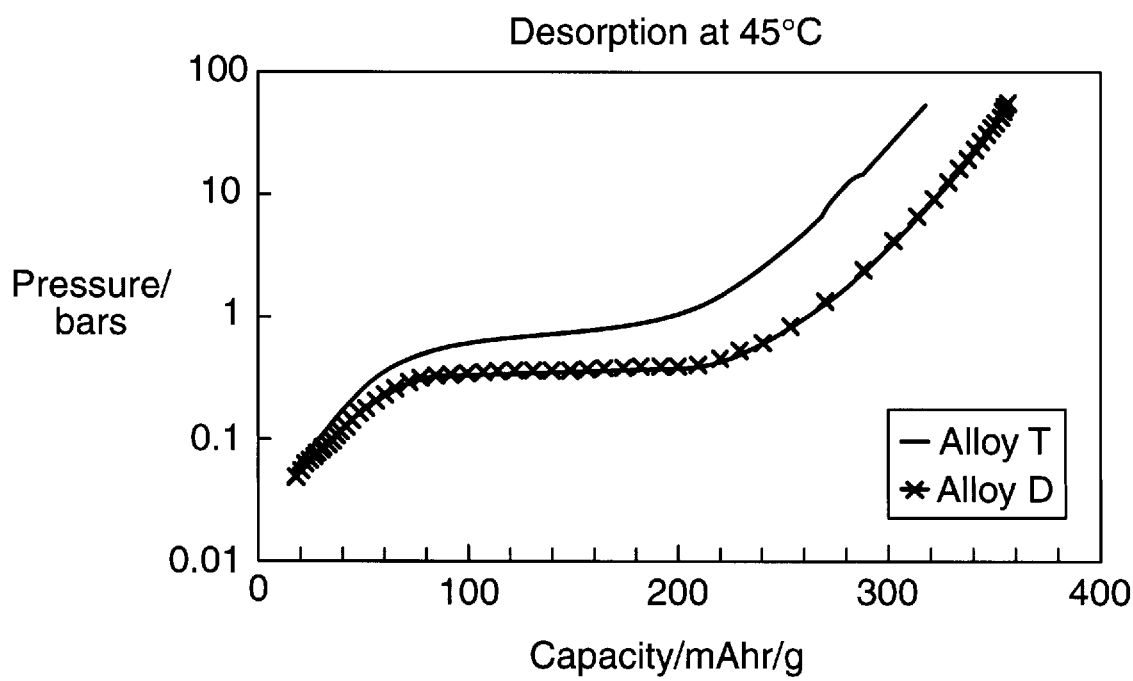
FIG. 14 illustrates an effect of higher levels of Zr.

FIG. 14 shows the disadvantage of higher Zr amounts used in prior art. In Alloy T, $Zr_{0.1}$ has been added as to Alloy F ($La_{0.45}Ce_{0.35}Nd_{0.15}Pr_{0.05}Ni_{3.7}Co_{0.7}Al_{0.6}$) as a partial substitute for the other "A" site elements. The resulting alloy is characterized by higher plateau pressure than Alloy D (with $Zr_{0.007}$) and significantly lower capacity, approximately 50 mAhr/g or 18% in the region between 0.05 bars and 2 bars. Although the plateau pressure of Alloy T remains in the useful range, Alloy T's capacity is too low to be useful in commercial Nickel-rechargeable cells.

Other embodiments will also fall within the scope of the following claims.

What is claimed is:

1. An $AB_5$ hydrogen absorbing alloy composition for use in an electrochemical cell, essentially according to the formulation $$LM_xNi_{A-(B+C+D)}Co_BAl_CMn_D$$

wherein

L comprises mischmetal including between about 45 and 70 percent lanthanum,

M comprises an element selected from the group consisting of titanium and zirconium, X is between 0.001 and 0.01, B C, and D are each greater than zero, and A is about 5, wherein the $AB_5$ hydrogen absorbing alloy composition comprises a homogeneous alloy.

2. The $AB_5$ alloy of claim 1 wherein B is between about 0.4 and 1.0.

3. The $AB_5$ alloy of claim 1 wherein C is between about 0.1 and 0.6.

4. The $AB_5$ alloy of claim 1 wherein D is less than about 0.45.

5. The $AB_5$ alloy of claim 1 wherein B is between about 0.4 and 1.0, C is between about 0.1 and 0.6, and D is less than about 0.45.

6. The $AB_5$ alloy of claim 1 wherein X is between about 0.002 and 0.006.

7. The $AB_5$ alloy of claim 1 wherein X is about 0.0035.

8. An $AB_5$ hydrogen absorbing alloy composition for use in an electrochemical cell, essentially according to the formulation $$La_{0.63}Ce_{0.26}Nd_{0.08}Pr_{0.03}M_xNi_{3.7}Co_{0.78}Al_{0.28}Mn_{0.36}$$

wherein M comprises an alloying element selected from the group consisting of titanium and zirconium and combinations thereof, and X is between 0.001 and 0.01, wherein the $AB_5$ hydrogen absorbing alloy composition comprises a homogeneous alloy.

9. The $AB_5$ alloy of claim 8 wherein X is between about 0.002 and 0.006.

10. The $AB_5$ alloy of claim 8 wherein X is about 0.0035.

11. A method of producing an $AB_5$ hydrogen storage alloy for use in an electrochemical cell, the method comprising melting a melt charge in an inert environment under superatmospheric pressure, the melt charge comprising mischmetal, nickel, cobalt and aluminum;

adding an alloying element to the molten melt charge, the alloying element selected from the group consisting of zirconium, titanium, and mixtures thereof, the amount of added alloying element selected to produce an alloy having between 0.01 and 0.001 mole percent of said alloying element; and allowing the melt charge to cool to room temperature.

12. A method of producing an $AB_5$ hydrogen storage alloy for use in an electrochemical cell, the method comprising providing a melt charge comprising mischmetal, nickel, cobalt and aluminum;

placing the melt charge in a furnace;

establishing a pressurized furnace environment substantially of argon gas;

melting the melt charge while maintaining the furnace environment pressure;

adding an alloying element to the molten melt charge, the alloying element selected from the group consisting of zirconium, titanium, and mixtures thereof, the amount of added alloying element selected to produce an alloy with between 0.01 and 0.001 mole percent of said alloying element; and allowing the alloy to cool to less than 50 degrees Celsius.

13. The method of claim 12 further comprising heat treating the cooled alloy for at least about 6 hours at about 1050 degrees Celsius.

14. The method of claim 12 further comprising pulverizing the cooled alloy to produce an alloy powder, and sieving the powder to remove particles greater than about 75 microns in size.

15. An electrochemical cell comprising:

a positive electrode containing nickel hydroxide; and a negative electrode containing an $AB_5$ hydrogen absorbing alloy, essentially according to the formulation $$LM_xNi_{A-(B+C+D)}Co_BAl_CMn_D$$

wherein

L comprises mischmetal including between about 45 and 70 percent lanthanum,

M comprises an element selected from the group consisting of titanium, zirconium, and combinations thereof, X is between 0.001 and 0.01, B C, and D are each greater than zero, and A is about 5, wherein the $AB_5$ hydrogen absorbing alloy comprises a homogeneous alloy.

16. A metallic particle for use in an electrode of an electrochemical cell, the particle consisting essentially of an $AB_5$ hydrogen absorbing alloy comprising $$LM_xNi_{A-(B+C+D)}Co_BAl_CMn_D$$

wherein

L comprises mischmetal including between about 45 and 70 percent lanthanum,

M comprises an element selected from the group consisting of titanium and zirconium, X is between 0.001 and 0.01, B C, and D are each greater than zero, and A is about 5, wherein the $AB_5$ hydrogen absorbing alloy composition comprises a homogeneous alloy.

* * * * *